(12) United States Patent
Charkin et al.

(10) Patent No.: US 12,017,683 B2
(45) Date of Patent: Jun. 25, 2024

(54) METHOD AND DEVICE FOR OPERATING A SELF-DRIVING CAR

(71) Applicant: YANDEX SELF DRIVING GROUP LLC, Moscow (RU)

(72) Inventors: Kanstantin Charkin, p.Polyana (BY); Aliaksei Labanau, Minsk (BY)

(73) Assignee: Direct Cursus Technology L.L.C, Dubai (AE)

( * ) Notice: Subject to any disclaimer, the term of this patent is extended or adjusted under 35 U.S.C. 154(b) by 308 days.

(21) Appl. No.: 17/586,612

(22) Filed: Jan. 27, 2022

(65) Prior Publication Data
US 2022/0371619 A1 Nov. 24, 2022

(30) Foreign Application Priority Data
May 24, 2021 (RU) .................................. 2021114644

(51) Int. Cl.
*B60W 60/00* (2020.01)
*B60W 50/00* (2006.01)

(52) U.S. Cl.
CPC ........ *B60W 60/0011* (2020.02); *B60W 50/00* (2013.01); *B60W 2050/0022* (2013.01); *B60W 2050/006* (2013.01); *B60W 2520/10* (2013.01); *B60W 2552/10* (2020.02); *B60W 2552/30* (2020.02); *B60W 2554/20* (2020.02); *B60W 2554/4041* (2020.02); *B60W 2554/801* (2020.02); *B60W 2555/60* (2020.02)

(58) Field of Classification Search
CPC ................................................ B60W 60/0011
See application file for complete search history.

(56) References Cited

U.S. PATENT DOCUMENTS

| | | | |
|---|---|---|---|
| 10,551,840 | B2 | 2/2020 | Zhu et al. |
| 10,688,991 | B2 | 6/2020 | Lujan et al. |
| 10,725,470 | B2 | 7/2020 | Mohabadi et al. |
| 10,754,339 | B2 | 8/2020 | Zhu et al. |
| 10,816,990 | B2 | 10/2020 | Li et al. |
| 10,824,153 | B2 | 11/2020 | Zhang et al. |

(Continued)

FOREIGN PATENT DOCUMENTS

| | | |
|---|---|---|
| CN | 110763233 A | 2/2020 |
| CN | 111123927 A | 5/2020 |

(Continued)

OTHER PUBLICATIONS

Russian Search Report dated Jan. 21, 2022 issued in respect of the counterpart Russian Patent Application No. RU 2021114644.

(Continued)

*Primary Examiner* — Michael A Berns
(74) *Attorney, Agent, or Firm* — BCF LLP

(57) ABSTRACT

Methods and devices for operating a Self-Driving Car (SDC) are disclosed. The method includes generating a first graph-structure having nodes and edges, ranking the edges based on a priority logic into a ranked list of edges, and generating a second graph-structure (i) by iteratively generating attributes for respective ones from the ranked list of edges beginning with a highest priority edge in the ranked list of edges and (ii) until a pre-determined limit is met. The method also includes causing operation of the SDC on the road segment using the second graph-structure.

20 Claims, 9 Drawing Sheets

(56) References Cited

U.S. PATENT DOCUMENTS

| | | | |
|---|---|---|---|
| 10,884,422 B2 * | 1/2021 | Zhang | G05D 1/0223 |
| 10,990,099 B2 * | 4/2021 | Le | G05D 1/0214 |
| 11,215,471 B2 * | 1/2022 | Kanajan | G06Q 30/0645 |
| 11,429,105 B2 * | 8/2022 | Sorin | G05D 1/0274 |
| 11,493,926 B2 * | 11/2022 | He | G06N 3/006 |
| 11,519,742 B2 * | 12/2022 | Voznesensky | B60W 40/06 |
| 11,555,706 B1 * | 1/2023 | Levihn | G05D 1/0088 |
| 11,604,071 B2 * | 3/2023 | Liu | G01C 21/387 |
| 11,760,384 B2 * | 9/2023 | Hud | G01C 21/30 701/117 |
| 11,772,638 B2 * | 10/2023 | Leitermann | B60W 30/09 701/26 |
| 2019/0163191 A1 | 5/2019 | Sorin et al. | |
| 2019/0286151 A1 | 9/2019 | Palanisamy et al. | |
| 2019/0317515 A1 | 10/2019 | Zhang et al. | |
| 2020/0159216 A1 | 5/2020 | Le et al. | |
| 2020/0159233 A1 | 5/2020 | Zhang et al. | |
| 2020/0182633 A1 | 6/2020 | Liu | |
| 2020/0192391 A1 | 6/2020 | Vora et al. | |
| 2020/0200553 A1 | 6/2020 | Voznesensky et al. | |
| 2020/0240805 A1 | 7/2020 | Kanajan et al. | |
| 2020/0339158 A1 | 10/2020 | Gud et al. | |
| 2020/0353917 A1 | 11/2020 | Leitermann et al. | |
| 2020/0363814 A1 | 11/2020 | He et al. | |
| 2022/0371619 A1 * | 11/2022 | Charkin | B60W 60/0011 |
| 2022/0388531 A1 * | 12/2022 | Usikov | G06V 20/58 |

FOREIGN PATENT DOCUMENTS

| | | |
|---|---|---|
| CN | 111829545 A | 10/2020 |
| RU | 2638879 C2 | 12/2017 |

OTHER PUBLICATIONS

Extended European Search Report dated Aug. 4, 2022 issued in respect of the counterpart European Patent Application No. 22154091.7.

\* cited by examiner

METHOD AND DEVICE FOR OPERATING A SELF-DRIVING CAR

CROSS-REFERENCE

The present application claims priority to Russian Patent Application No. 2021114644, entitled "Method and Device for Operating a Self-Driving Car", filed May 24, 2021, the entirety of which is incorporated herein by reference.

TECHNICAL FIELD

The present technology relates generally to Self Driving Cars (SDCs); and in particular, to an electronic device for and method of operating a SDC.

BACKGROUND

Self-Driving Cars (SDCs) are vehicles that are able to autonomously drive themselves through private and/or public spaces. Using a system of sensors that detect the location and/or surroundings of the SDC, logic within or associated with the SDC controls the speed, propulsion, braking, and steering of the SDC based on the sensor-detected location and surroundings of the SDC. For example, a computer system can leverage sensor data for generating future trajectories for the SDC on a road segment and can control operation of the SDC so that it follows a selected trajectory on the road segment.

One of the main technical challenges in implementing the above systems is the ability for the computer system to detect an object present around the vehicle—such as the vehicle in front of the present vehicle (the present vehicle having the computer system onboard), which vehicle in front may pose a risk/danger to the present vehicle and may require the computer system to take a corrective measure, be it braking or otherwise changing speed, stopping or changing lanes. On a more granular level, the challenge of the object detection is not just the binary detection (presence or absence of the object), but the speed and accuracy associated with such an analysis and determination (especially avoiding "false negatives", whereby the system does not identify an object which is indeed present in front or around the vehicle).

The acuteness of this problem is illustrated by the following hypothetical scenario. Imagine that the self-driving or partially-autonomous vehicle is driving along the route. A child (or an adult, a pet, and the like) runs in front of the vehicle. It is imperative that the computer system controlling the vehicle detects the presence of the object fast and take corrective actions to avoid the collision. Naturally, the faster the computer system detects the presence of the object, the more time the computer system will have to determine the corrective action and to command the vehicle to execute the corrective action.

Typically, the SDC has a plurality of sensors to enable the SDC to capture and "understand" its surround area. A variety of sensor systems may be used by the SDC, such as but not limited to camera systems, radar systems, and LIDAR systems. Different sensor systems may be employed for capturing different information, and/or in different format, about the location and the surroundings of the SDC. For example, camera systems may be used for capturing image data about the surroundings of the SDC. In another example, LIDAR systems may be used to capture point cloud data for building 3D map representations of the surroundings and other potential objects located in proximity to the SDC.

It is generally known for the SDC to process data captured by such the plurality of sensors to generate a prediction, typically using a Machine Learning Algorithm (MLA) in regard to presence of one or more objects in the vicinity of the SDC. Such the prediction can then be used by the SDC to determine the most optimal current maneuver, be it to continue driving, stop, change direction, accelerate, or the like.

US Patent Publication US2020/159216 discloses methods and systems for motion planning in an autonomous vehicle (AV) that separate path planning and velocity planning and may use reference lines in combination with motion planners to determine paths. The method may include reference lines to project planning data into a S-L coordinate system. A motion planner algorithm uses the reference lines and previous path planning history to generate a path in the S-L coordinate system. A velocity is determined for the path. An AV controller is updated with the path and the velocity. Motion planning computations use a dynamic vehicle lookup table to determine possible vehicle motions based on an initial state and control input.

SUMMARY

Therefore, there is a need for systems and methods that avoid, reduce or overcome the limitations of the prior art. It should be noted that generation of data for controlling operation of a Self Driving Car (SDC), such as trajectory data, for example, may require a graph-structure of a road segment on which the SDC is currently operating. For instance, an electronic device may be configured to first generate a graph-structure representative of respective potential positions of the SDC on the road segment and of transitions between those potential positions. In this instance, the electronic device may determine a given sequence of edges in the graph-structure which (i) is associated with an acceptable total cost of edges in the sequence, and (ii) is representative of a potential path that the SDC should follow on the road segment. The electronic device may then generate trajectory data for the SDC to actually follow that path on the road segment.

Generation of the graph-structure for the road segment is a computationally expensive operation, which can take a considerable amount of time. This is due to the fact that the electronic device needs to compute a plurality of attributes for respective edges of the graph-structure. In at least some embodiments of the present technology, developers of the present technology have devised methods and electronic devices for increasing the efficiency of the graph-structure generation process. Developers of the present technology have realized that reducing the number of computations and/or an amount of time necessary for generating the graph-structure allow reducing the total amount of time necessary for generating trajectory data for operating the SDC on the road segment. Increasing computational speed of the graph-structure generation process during operation of the SDC is beneficial for the operation of the SDC.

In at least some embodiments of the present technology, the graph-structure generating process includes (i) a preliminary phase, and (ii) a main iterative phase. During the preliminary stage, a "preliminary" graph-structure is initialized for the road segment. Generation of this preliminary graph-structure is a relatively inexpensive operation (in terms of the computing resources) if compared to the main iterative phase. The electronic device is then configured to rank edges of this preliminary graph-structure into a ranked list of edges having a highest priority edge at the top of the list and a lowest priority edge at the bottom of the list. The electronic device makes use of this ranked list of edges for performing the main iterative phase. During the main iterative phase, the electronic device performs a number of iterations. During a given iteration, the electronic device is configured to generate attributes for a respective edge from the list. It is contemplated that the electronic device generates attributes for respective edges during respective iterations, beginning with the highest priority edge and going down the ranked list of edges until a pre-determined limit is met. It should be noted that generating data for respective edges of the second graph-structure is a computationally expensive operation. Developers of the present technology have realized that iteratively generating attributes for edges from a ranked list of edges allows to prioritize generation of attributes for high priority edges over generation of attributes of low priority edges. Furthermore, developers of the present technology have realized that iteratively generating attributes for a ranked list of edges until a pre-determined limit is met allows reducing the time required for generating the second graph-structure (i.e., the actual graph-structure to be used during operation of the SDC), while ensuring that the attributes for high priority edges are generated and/or avoiding generating attributes for low priority edges.

In a first broad aspect of the present technology there is provided a method of operating a Self-Driving Car (SDC) on a road segment. The SDC travels on the road segment and the SDC is controlled by an electronic device. The method is executable by the electronic device. The method comprises generating, by the electronic device, a first graph-structure having nodes and edges. A given node is associated with a respective potential position of the SDC on the road segment. A given edge is representative of a transition of the SDC between potential positions of the respective pair of nodes. The method comprises ranking, by the electronic device, the edges based on a priority logic into a ranked list of edges. The ranked list of edges is indicative of a priority order of transitions between the respective potential positions of the SDC for operating the SDC on the road segment. The method comprises generating, by the electronic device, a second graph-structure (i) by iteratively generating attributes for respective ones from the ranked list of edges beginning with a highest priority edge in the ranked list of edges and (ii) until a pre-determined limit is met. The pre-determined limit is indicative of a total number of edges to be included in the second graph-structure. The second graph-structure has a set of edges from the first graph-structure for which the attributes are generated. The method comprises causing, by the electronic device, operation of the SDC on the road segment using the second graph-structure.

In some embodiments of the method, the generating the second graph-structure comprises executing, by the electronic device, a first iteration and a second iteration. The executing the first iteration includes generating, by the electronic device, the attributes for a first edge in the ranked list of edges, where the first edge is added to a current number of edges currently included in the second graph-structure. The executing the first iteration includes comparing, by the electronic device, the current number of edges against the pre-determined limit. In response to the current number of edges being below the pre-determined limit, triggering execution of the second iteration. The executing the second iteration includes generating, by the electronic device, the attributes for a second edge in the ranked list of edges, where the second edge is ranked immediately after the first edge in the ranked list of edges, and the second edge is added to the current number of edges currently included in the second graph-structure. The executing the second iteration includes comparing, by the electronic device, the current number of edges against the pre-determined limit. the executing the second iteration includes, in response to the current number of edges being equal to the pre-determined limit, stopping generation of the second graph-structure.

In some embodiments of the method, the causing operation of the SDC using the second graph-structure comprises: generating, by the electronic device, a potential path for the SDC on the road segment, where the potential path is representative of a respective sequence of edges in the second graph-structure; generating, by the electronic device, a potential trajectory for the SDC on the road segment using the attributes of the edges in the respective sequence of edges; and causing, by the electronic device, operation of the SDC for travelling on the road segment in accordance with the potential trajectory.

In some embodiments of the method, the ranking the edges into the ranked list of edges based on the priority logic comprises determining, by the electronic device, a weighted combination of pre-determined priority criteria. The pre-determined priority criteria includes at least one of: a positional offset of a given edge from a lane center, a length of the given edge, a distance between the given edge and a current position of the vehicle, an association of the edge with one of a current lane and a target lane, a curvature of the road segment corresponding to the given edge, a current speed of the vehicle, and a legal speed limit on the road segment.

In some embodiments of the method, the ranking the edges into the ranked list of edges comprises based on the priority logic comprises executing, by the electronic device, a Machine Learning Algorithm (MLA) having been trained to generate a predicted priority score for a given edge based on a plurality of pre-determined priority criteria. The edges are to be ranked based on the respective predicted priority scores.

In some embodiments of the method, the attributes of a given edge comprise at least one of: a distance of a given edge from one or more static objects on the road segment, and a distance of the given edge one or more dynamic objects on the road segment.

In some embodiments of the method, the pre-determined limit is the total number of edges.

In some embodiments of the method, the pre-determined limit is a total number of intermediary points along edges for which the attributes are to be determined.

In some embodiments of the method, the second graph-structure is used for operating the SDC on the road segment during a first planning cycle, and wherein the method further comprises generating, by the electronic device an other second graph-structure for a second planning cycle, and causing, by the electronic device, operation of the SDC on the road segment using the other second graph-structure during the second planning cycle.

In some embodiments of the method, the method further comprises: receiving, by the electronic device, first sensor data at a first moment in time from a sensor system mounted on the SDC, where the first sensor data is indicative of information about the road segment at the first moment in time; causing, by the electronic device, the first planning cycle at the first moment in time for generating the second graph-structure based on the first sensor data; receiving, by the electronic device, second sensor data at a second moment in time from the sensor system mounted on the SDC, where the second sensor data is indicative of information about the road segment at the second moment in time, where the second moment in time is after the first moment in time; and causing, by the electronic device, the second planning cycle at the second moment in time for generating the other second graph-structure based on the second sensor data.

In some embodiments of the method, the generating the second graph-structure comprises executing, by the electronic device, a first iteration and a second iteration. The executing the first iteration includes generating, by the electronic device, the attributes for a first edge in the ranked list of edges, where the first edge is added to a current number of edges currently included in the second graph-structure. The executing the first iteration includes comparing, by the electronic device, the current number of edges against the pre-determined limit. In response to the current number of edges being below the pre-determined limit, triggering execution of the second iteration. The executing the second iteration includes generating, by the electronic device, the attributes for a second edge in the ranked list of edges, where the second edge is a next edge in the ranked list of edges after the first edge and which is connected to at least one edge currently included in the second graph-structure, and the second edge is added to the current number of edges currently included in the second graph-structure. The executing the second iteration includes comparing, by the electronic device, the current number of edges against the pre-determined limit. the executing the second iteration includes, in response to the current number of edges being equal to the pre-determined limit, stopping generation of the second graph-structure.

In a second broad aspect of the present technology, there is provided an electronic device for operating a Self-Driving Car (SDC) on a road segment. The SDC travels on the road segment and the SDC is controlled by the electronic device. The electronic device is configured to generate a first graph-structure having nodes and edges, where a given node is associated with a respective potential position of the SDC on the road segment, and where a given edge is representative of a transition of the SDC between potential positions of the respective pair of nodes. The electronic device is configured to rank the edges based on a priority logic into a ranked list of edges, where the ranked list of edges is indicative of a priority order of transitions between the respective potential positions of the SDC for operating the SDC on the road segment. The electronic device is configured to generate a second graph-structure (i) by iteratively generating attributes for respective ones from the ranked list of edges beginning with a highest priority edge in the ranked list of edges and (ii) until a pre-determined limit is met. The pre-determined limit is indicative of a total number of edges to be included in the second graph-structure. The second graph-structure has a set of edges from the first graph-structure for which the attributes are generated. The electronic device is configured to cause operation of the SDC on the road segment using the second graph-structure.

In some embodiments of the electronic device, the electronic device configured to generate the second graph-structure comprises the electronic device configured to execute a first iteration and a second iteration. To execute the first iteration includes the electronic device configured to generate the attributes for a first edge in the ranked list of edges, where the first edge is added to a current number of edges currently included in the second graph-structure. To execute the first iteration includes the electronic device configured to compare the current number of edges against the pre-determined limit. In response to the current number of edges being below the pre-determined limit, trigger execution of the second iteration. To execute the second iteration includes the electronic device configured to generate the attributes for a second edge in the ranked list of edges, where the second edge is ranked immediately after the first edge in the ranked list of edges, and the second edge is added to the current number of edges currently included in the second graph-structure. To execute the second iteration includes the electronic device configured to compare the current number of edges against the pre-determined limit. To execute the second iteration includes the electronic device configured to, in response to the current number of edges being equal to the pre-determined limit, stop generation of the second graph-structure.

In some embodiments of the electronic device, the electronic device configured to cause operation of the SDC using the second graph-structure comprises the electronic device configured to: generate a potential path for the SDC on the road segment, where the potential path is representative of a respective sequence of edges in the second graph-structure; and generate a potential trajectory for the SDC on the road segment using the attributes of the edges in the respective sequence of edges; and cause operation of the SDC for travelling on the road segment in accordance with the potential trajectory.

In some embodiments of the electronic device, the electronic device configured to rank the edges into the ranked list of edges based on the priority logic comprises the electronic device configured to determine a weighted combination of pre-determined priority criteria. The pre-determined priority criteria include at least one of: a positional offset of a given edge from a lane center, a length of the given edge, a distance between the given edge and a current position of the vehicle, an association of the edge with one of a current lane and a target lane, a curvature of the road segment corresponding to the given edge, a current speed of the vehicle, and a legal speed limit on the road segment.

In some embodiments of the electronic device, the electronic device configured to rank the edges into the ranked list of edges comprises based on the priority logic comprises the electronic device configured to execute a Machine Learning Algorithm (MLA) having been trained to generate a predicted priority score for a given edge based on a plurality of pre-determined priority criteria. The edges are to be ranked based on the respective predicted priority scores.

In some embodiments of the electronic device, the attributes of a given edge comprise at least one of: a distance of a given edge from one or more static objects on the road segment, and a distance of the given edge one or more dynamic objects on the road segment.

In some embodiments of the electronic device, the pre-determined limit is the total number of edges.

In some embodiments of the electronic device, the pre-determined limit is a total number of intermediary points along edges for which the attributes are to be determined.

In some embodiments of the electronic device, the second graph-structure is used for operating the SDC on the road segment during a first planning cycle, and wherein the electronic device is further configured to generate an other second graph-structure for a second planning cycle, and cause operation of the SDC on the road segment using the other second graph-structure during the second planning cycle.

In some embodiments of the electronic device, the electronic device is further configured to: receive first sensor data at a first moment in time from a sensor system mounted on the SDC, where the first sensor data is indicative of information about the road segment at the first moment in time; cause the first planning cycle at the first moment in time for generating the second graph-structure based on the first sensor data; receive second sensor data at a second moment in time from the sensor system mounted on the SDC, where the second sensor data is indicative of information about the road segment at the second moment in time, the second moment in time is after the first moment in time; and cause the second planning cycle at the second moment in time for generating the other second graph-structure based on the second sensor data.

In some embodiments of the electronic device, the electronic device configured to generate the second graph-structure comprises the electronic device configured to execute a first iteration and a second iteration. To execute the first iteration includes the electronic device configured to generate the attributes for a first edge in the ranked list of edges, where the first edge is added to a current number of edges currently included in the second graph-structure. To execute the first iteration includes the electronic device configured to compare the current number of edges against the pre-determined limit. In response to the current number of edges being below the pre-determined limit, trigger execution of the second iteration. To execute the second iteration includes the electronic device configured generate the attributes for a second edge in the ranked list of edges, where the second edge is a next edge in the ranked list of edges after the first edge and which is connected to at least one edge currently included in the second graph-structure, and the second edge is added to the current number of edges currently included in the second graph-structure. To execute the second iteration includes the electronic device configured to compare the current number of edges against the pre-determined limit. To execute the second iteration includes the electronic device configured to, in response to the current number of edges being equal to the pre-determined limit, stop generation of the second graph-structure.

In the context of the present specification, the term "surroundings" of a given vehicle refers to an area or a volume around the given vehicle including a portion of a current environment thereof accessible for scanning using one or more sensors mounted on the given vehicle, for example, for generating a 3D map of the such surroundings or detecting objects therein.

In the context of the present specification, a "Region of Interest" may broadly include a portion of the observable environment of a LiDAR system in which the one or more objects may be detected. It is noted that the region of interest of the LiDAR system may be affected by various conditions such as but not limited to: an orientation of the LiDAR system (e.g. direction of an optical axis of the LiDAR system); a position of the LiDAR system with respect to the environment (e.g. distance above ground and adjacent topography and obstacles); operational parameters of the LiDAR system (e.g. emission power, computational settings, defined angles of operation), etc. The ROI of LIDAR system may be defined, for example, by a plane angle or a solid angle. In one example, the ROI may also be defined within a certain distance range (e.g. up to 200 m or so).

In the context of the present specification, a "server" is a computer program that is running on appropriate hardware and is capable of receiving requests (e.g. from client devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. In the context of the present specification, the term "electronic device" implies that a device can function as a server for other electronic devices and client devices, however it is not required to be the case with respect to the present technology. Thus, some (non-limiting) examples of electronic devices include personal computers (desktops, laptops, netbooks, etc.), smart phones, and tablets, as well as network equipment such as routers, switches, and gateways. It should be understood that in the present context the fact that the device functions as an electronic device does not mean that it cannot function as a server for other electronic devices. The use of the expression "an electronic device" does not preclude multiple client devices being used in receiving/sending, carrying out or causing to be carried out any task or request, or the consequences of any task or request, or steps of any method described herein.

In the context of the present specification, "client device" is any computer hardware that is capable of running software appropriate to the relevant task at hand. In the context of the present specification, in general the term "client device" is associated with a user of the client device. Thus, some (non-limiting) examples of client devices include personal computers (desktops, laptops, netbooks, etc.), smart phones, and tablets, as well as network equipment such as routers, switches, and gateways It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "software component" is meant to include software (appropriate to a particular hardware context) that is both necessary and sufficient to achieve the specific function(s) being referenced.

In the context of the present specification, the expression "computer information storage media" (also referred to as "storage media") is intended to include media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first database" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware components, in other cases they may be different software and/or hardware components Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

DETAILED DESCRIPTION

Figure 1:
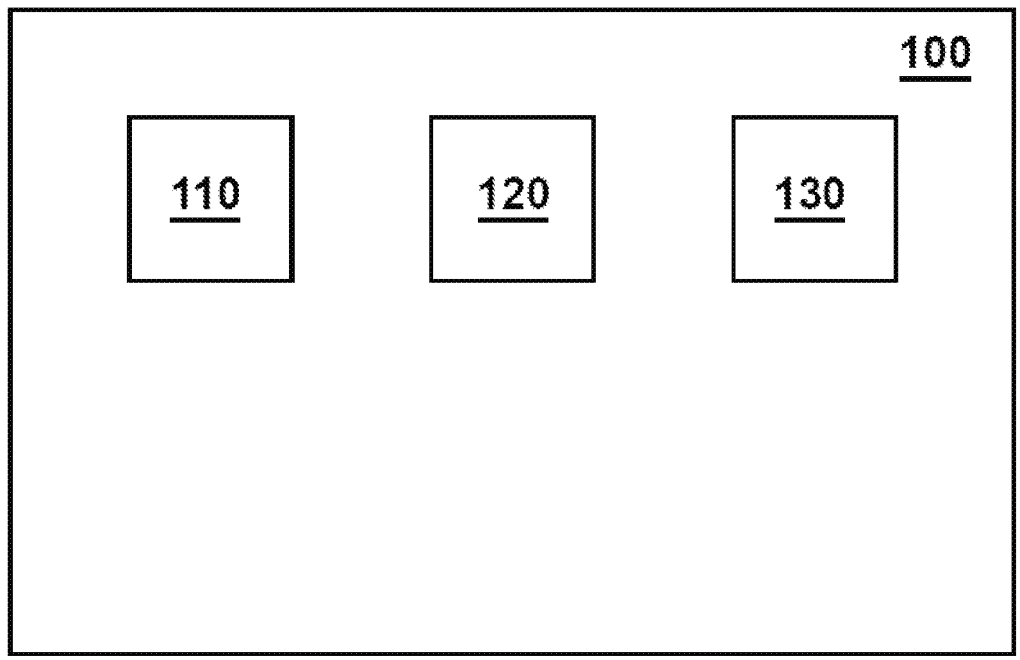
FIG. 1 depicts a schematic diagram of an example computer system configurable for implementing certain non-limiting embodiments of the present technology.
Figure 1:
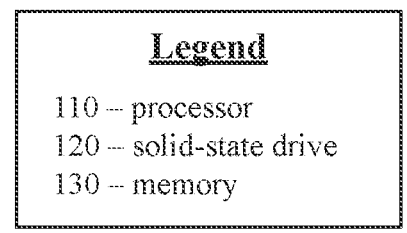

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Computer System

Referring initially to FIG. 1, there is depicted a schematic diagram of a computer system 100 suitable for use with some implementations of the present technology. The computer system 100 includes various hardware components including one or more single or multi-core processors collectively represented by a processor 110, a solid-state drive 120, and a memory 130, which may be a random-access memory or any other type of memory.

Communication between the various components of the computer system 100 may be enabled by one or more internal and/or external buses (not shown) (e.g. a PCI bus, universal serial bus, IEEE 1394 "Firewire" bus, SCSI bus, Serial-ATA bus, etc.), to which the various hardware components are electronically coupled. According to embodiments of the present technology, the solid-state drive 120 stores program instructions suitable for being loaded into the memory 130 and executed by the processor 110 for determining a presence of an object. For example, the program instructions may be part of a vehicle control application executable by the processor 110. It is noted that the computer system 100 may have additional and/or optional components (not depicted), such as network communication modules, localization modules, and the like.

Networked Computing Environment

Figure 2:
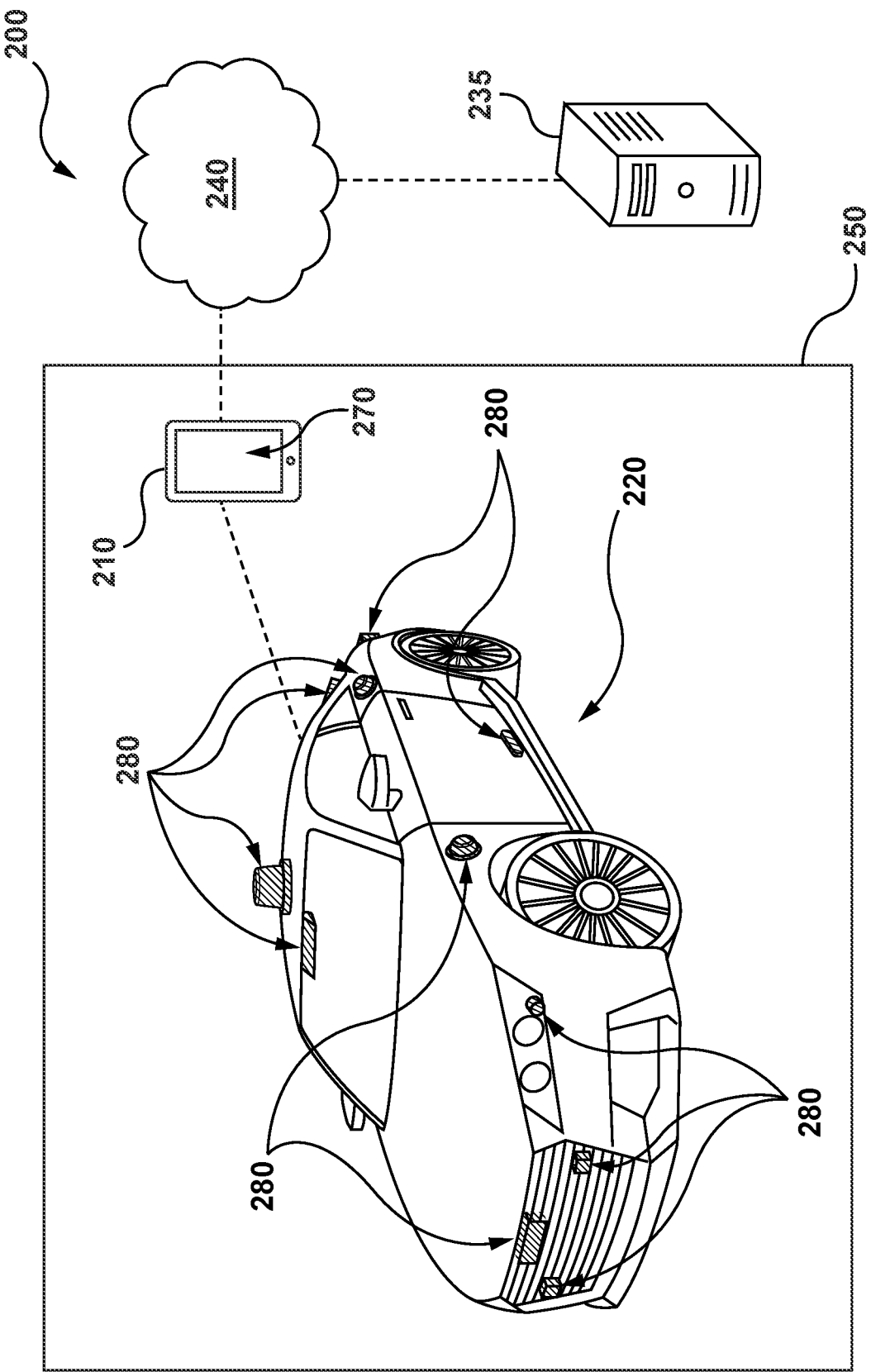
FIG. 2 depicts a schematic diagram of a networked computing environment being suitable for use with certain non-limiting embodiments of the present technology.

With reference to FIG. 2, there is depicted a networked computing environment 200 suitable for use with some non-limiting embodiments of the present technology. The networked computing environment 200 includes an electronic device 210 associated with a vehicle 220 and/or associated with a user (not depicted) who is associated with the vehicle 220 (such as an operator of the vehicle 220). The environment 200 also includes a server 235 in communication with the electronic device 210 via a communication network 240 (e.g. the Internet or the like, as will be described in greater detail herein below).

In at least some non-limiting embodiments of the present technology, the electronic device 210 is communicatively coupled to control systems of the vehicle 220. The electronic device 210 could be arranged and configured to control different operations systems of the vehicle 220, including but not limited to: an ECU (engine control unit), steering systems, braking systems, and signaling and illumination systems (i.e. headlights, brake lights, and/or turn signals). In such an embodiment, the vehicle 220 could be a self-driving vehicle 220.

In some non-limiting embodiments of the present technology, the networked computing environment 200 could include a GPS satellite (not depicted) transmitting and/or receiving a GPS signal to/from the electronic device 210. It will be understood that the present technology is not limited to GPS and may employ a positioning technology other than GPS. It should be noted that the GPS satellite can be omitted altogether.

The vehicle 220, to which the electronic device 210 is associated, could be any transportation vehicle, for leisure or otherwise, such as a private or commercial car, truck, motorbike or the like. Although the vehicle 220 is depicted as being a land vehicle, this may not be the case in each and every non-limiting embodiment of the present technology. For example, in certain non-limiting embodiments of the present technology, the vehicle 220 may be a watercraft, such as a boat, or an aircraft, such as a flying drone.

The vehicle 220 may be user operated or a driver-less vehicle. In some non-limiting embodiments of the present technology, it is contemplated that the vehicle 220 could be implemented as a Self-Driving Car (SDC). It should be noted that specific parameters of the vehicle 220 are not limiting, these specific parameters including for example: vehicle manufacturer, vehicle model, vehicle year of manufacture, vehicle weight, vehicle dimensions, vehicle weight distribution, vehicle surface area, vehicle height, drive train type (e.g. 2x or 4x), tire type, brake system, fuel system, mileage, vehicle identification number, and engine size.

According to the present technology, the implementation of the electronic device 210 is not particularly limited. For example, the electronic device 210 could be implemented as a vehicle engine control unit, a vehicle CPU, a vehicle navigation device (e.g. TomTom™, Garmin™), a tablet, a personal computer built into the vehicle 220, and the like. Thus, it should be noted that the electronic device 210 may or may not be permanently associated with the vehicle 220. Additionally or alternatively, the electronic device 210 could be implemented in a wireless communication device such as a mobile telephone (e.g. a smart-phone or a radio-phone). In certain embodiments, the electronic device 210 has a display 270.

The electronic device 210 could include some or all of the components of the computer system 100 depicted in FIG. 1, depending on the particular embodiment. In certain embodiments, the electronic device 210 is an on-board computer device and includes the processor 110, the solid-state drive 120 and the memory 130. In other words, the electronic device 210 includes hardware and/or software and/or firmware, or a combination thereof, for processing data as will be described in greater detail below.

In some non-limiting embodiments of the present technology, the communication network 240 is the Internet. In alternative non-limiting embodiments of the present technology, the communication network 240 can be implemented as any suitable local area network (LAN), wide area network (WAN), a private communication network or the like. It should be expressly understood that implementations for the communication network 240 are for illustration purposes only. A communication link (not separately numbered) is provided between the electronic device 210 and the communication network 240, the implementation of which will depend, inter alia, on how the electronic device 210 is implemented. Merely as an example and not as a limitation, in those non-limiting embodiments of the present technology where the electronic device 210 is implemented as a wireless communication device such as a smartphone or a navigation device, the communication link can be implemented as a wireless communication link. Examples of wireless communication links may include, but are not limited to, a 3G communication network link, a 4G communication network link, and the like. The communication network 240 may also use a wireless connection with the server 235.

In some embodiments of the present technology, the server 235 is implemented as a computer server and could include some or all of the components of the computer system 100 of FIG. 1. In one non-limiting example, the server 235 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server 235 is a single server. In alternative non-limiting embodiments of the present technology, the functionality of the server 235 may be distributed and may be implemented via multiple servers (not shown).

In some non-limiting embodiments of the present technology, the processor 110 of the electronic device 210 could be in communication with the server 235 to receive one or more updates. Such updates could include, but are not limited to, software updates, map updates, routes updates, weather updates, and the like. In some non-limiting embodiments of the present technology, the processor 110 can also be configured to transmit to the server 235 certain operational data, such as routes travelled, traffic data, performance data, and the like. Some or all such data transmitted between the vehicle 220 and the server 235 may be encrypted and/or anonymized.

It should be noted that a variety of sensors and systems may be used by the electronic device 210 for gathering information about surroundings 250 of the vehicle 220. As seen in FIG. 2, the vehicle 220 may be equipped with a plurality of sensor systems 280. It should be noted that different sensor systems from the plurality of sensor systems 280 may be used for gathering different types of data regarding the surroundings 250 of the vehicle 220.

In one example, the plurality of sensor systems 280 may include various optical systems including, inter alia, one or more camera-type sensor systems that are mounted to the vehicle 220 and communicatively coupled to the processor 110 of the electronic device 210. Broadly speaking, the one or more camera-type sensor systems may be configured to gather image data about various portions of the surroundings 250 of the vehicle 220. In some cases, the image data provided by the one or more camera-type sensor systems could be used by the electronic device 210 for performing object detection procedures. For example, the electronic device 210 could be configured to feed the image data provided by the one or more camera-type sensor systems to an Object Detection Neural Network (ODNN) that has been trained to localize and classify potential objects in the surroundings 250 of the vehicle 220.

In another example, the plurality of sensor systems 280 could include one or more radar-type sensor systems that are mounted to the vehicle 220 and communicatively coupled to the processor 110. Broadly speaking, the one or more radar-type sensor systems may be configured to make use of radio waves to gather data about various portions of the surroundings 250 of the vehicle 220. For example, the one or more radar-type sensor systems may be configured to gather radar data about potential objects in the surroundings 250 of the vehicle 220, such data potentially being representative of a distance of objects from the radar-type sensor system, orientation of objects, velocity and/or speed of objects, and the like.

In a further example, the plurality of sensor systems 280 could include one or more Light Detection and Ranging (LIDAR) systems that are mounted to the vehicle 220 and communicatively coupled to the processor 110. Broadly speaking, a LIDAR system is configured to capture data about the surroundings 250 of the vehicle 220 used, for example, for building a multi-dimensional map of objects in the surroundings 250 of the vehicle 220. The LIDAR system could be mounted, or retrofitted, to the vehicle 220 in a variety of locations and/or in a variety of configurations for gathering information about surroundings 250 of the vehicle 220.

For example, depending on the implementation of the vehicle 220 and the LIDAR system, the LIDAR system could be mounted on an interior, upper portion of a windshield of the vehicle 220. Nevertheless, other locations for mounting the lidar system are within the scope of the present disclosure, including on a back window, side windows, front hood, rooftop, front grill, front bumper or the side of the vehicle 220.

In the context of the present technology, the electronic device 210 is configured to detect one or more objects in the surroundings 250 of the vehicle 220 based on data acquired from one or more camera systems and from one or more LIDAR systems. For example, the electronic device 210 configured to detect a given object in the surroundings 250 of the vehicle 220 may be configured to identify LIDAR data and camera data associated with the given object, generate an "embedding" representative of features associated with the given object, and detect the object by generating a bounding box for the object.

Figure 3:
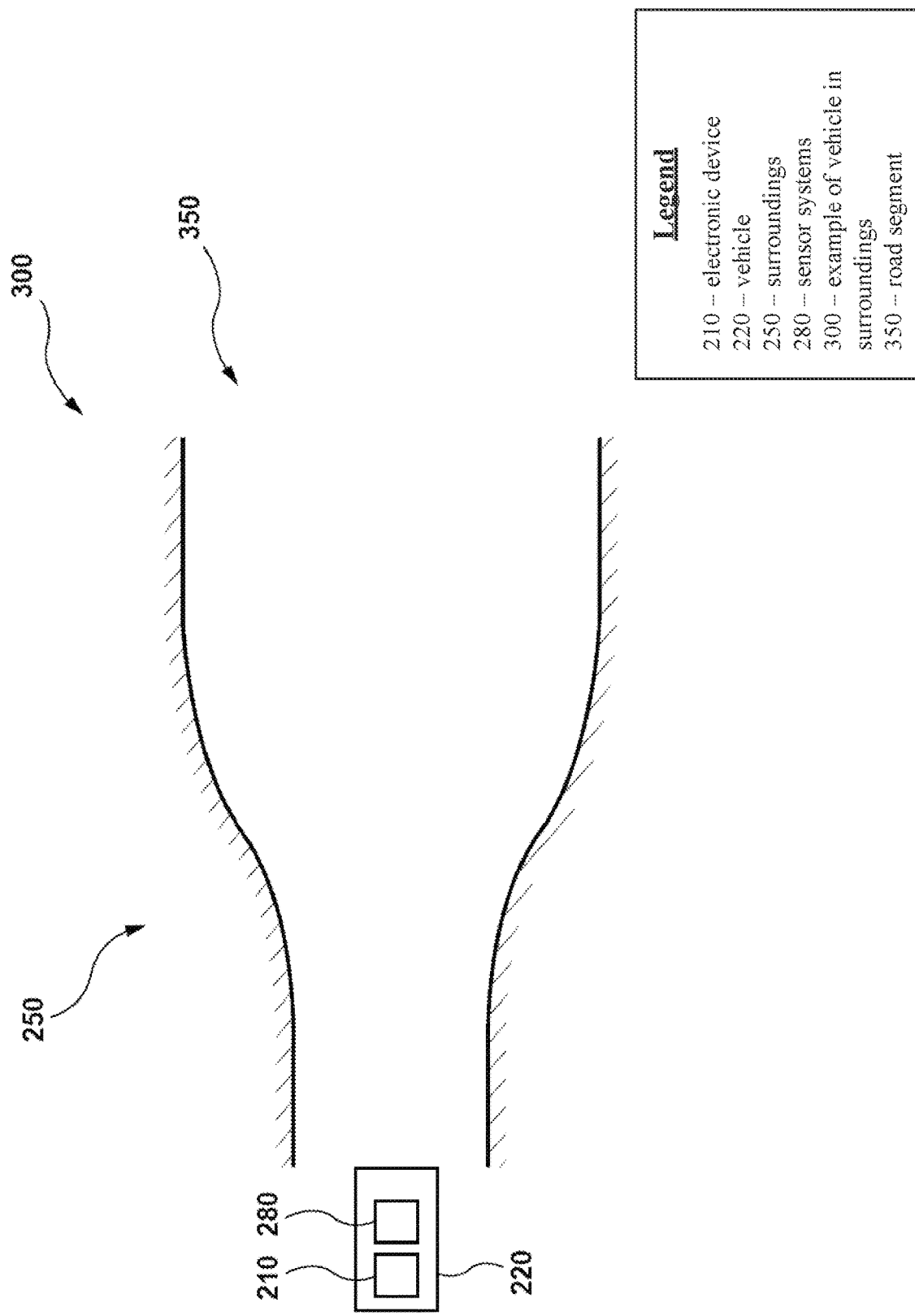
FIG. 3 depicts a representation of a vehicle travelling on a road segment in accordance with some embodiments of the present technology.

With reference to FIG. 3, there is an illustrative example 300 of the vehicle 220 in the surroundings 250. Let it be assumed that the vehicle 220 is travelling on a road segment 350. The electronic device 210 may receive from the sensor system 280 information about the surroundings 250 of the vehicle 220, and more particularly, about the road segment 350 and one or more "actors" (also sometimes referred to as "agents") on the road segment 350, such as neighboring objects in surroundings of the vehicle 220.

Figure 4:
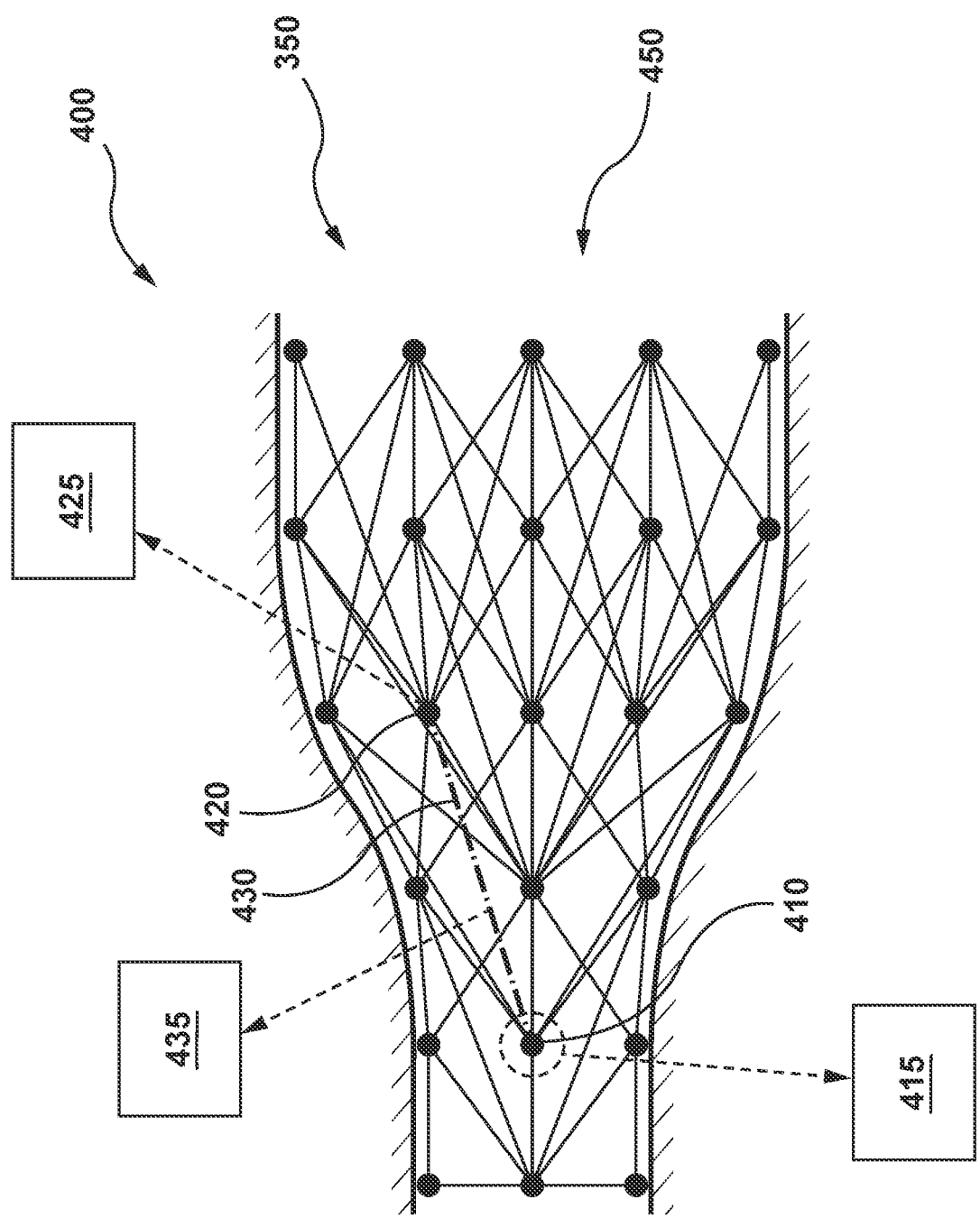
FIG. 4 depicts a representation of a first graph-structure generated by an electronic device of FIG. 2 for the road segment in accordance with some embodiments of the present technology.

The electronic device 210 may be configured to make use of the information received from the sensor system 280 for generating a "preliminary" graph-structure. With reference to FIG. 4, there is depicted a representation 400 of a preliminary graph-structure 450 that the electronic device 210 is configured to generate based on information about the surroundings 250 of the vehicle 220.

The preliminary graph-structure 450 has a plurality of nodes (not numbered) and a plurality of edges (not numbered) connecting respective nodes of the plurality of nodes. For example, an edge 430 of the preliminary graph-structure 450 connects a first node 410 and a second node 420. A given node is associated with a respective potential position of the vehicle 220 on the road segment 350. A given edge is representative of a transition of the vehicle 220 between potential positions of the respective pair of nodes. For example, the edge 430 is representative of the transition of the vehicle 220 between its potential positions of the first node 410 and the second node 420.

It should be noted that the electronic device 210 may be configured to store information in association with a respective node and a respective edge of the preliminary graph-structure 450. For example, the electronic device 210 may be configured to store positional data in association with a given node. In another example, the electronic device 210 may be configured to store, in association with a given edge, the positional data of a respective pair of nodes.

Furthermore, it is contemplated that additional data may be stored in association with a respective node of the preliminary graph-structure 450. It can be said that additional data may be stored in association with a respective node of the preliminary graph-structure 450 and which is indicative of at least some information about a potential state of the vehicle 220 on the road segment 350.

Figure 5:
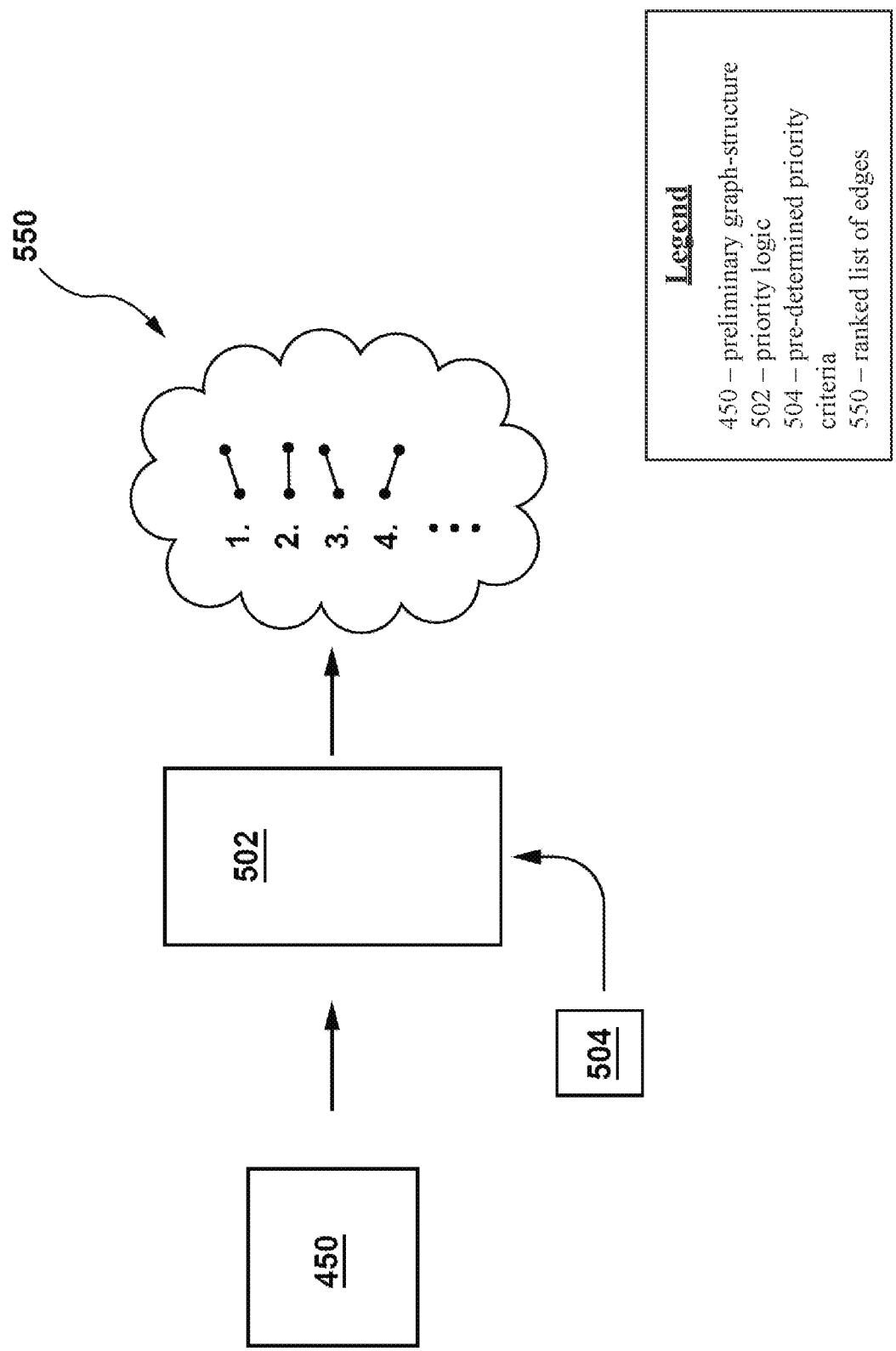
FIG. 5 depicts a representation of a ranked list of edges generated by the electronic device in accordance with some embodiments of the present technology.

In the context of the present technology, the electronic device 210 is configured to rank the plurality of edges of the preliminary graph-structure 450 based on a "priority logic" 502 as depicted in FIG. 5. Broadly speaking, the priority logic can be implemented as one or more algorithms executed by the electronic device 210 and which is/are configured to generate a "priority score" for a respective edge based on (i) information associated with the respective edge and (ii) one or more pre-determined priority criteria 504. The electronic device 210 may make use of so-generated priority scores for ranking the plurality of edges of the preliminary graph-structure into a ranked list of edges 550. It is contemplated that the electronic device 210 may generate a given priority score while taking into account the pre-determined priority criteria 504 such as, for example:

- a positional offset of an edge from a lane center;
- a change in positional offset from a lane center within an edge;
- a length of an edge;
- a distance between an edge and a current position of the vehicle;
- an association of an edge with one of a current lane, target lane, or other neighboring lane;
- a curvature of a road segment itself (e.g., for potentially adding more edges when performing turning maneuvers);
- a current speed of the vehicle;
- a legal speed limit on the road segment;
- preliminary estimation of edge attributes (e.g., "rough" estimation of a distance between an edge and a given object on the road segment, for potentially adding more edges near an object for more accurate operation in proximity to the object); and
- the like.

In at least some embodiments of the present technology, the electronic device 210 may be configured to generate a priority score for a given edge based on a weighted combination of values determined for one or more of the priority criteria non-exhaustively listed above. In one embodiment of the present technology, it is contemplated that the weights attributed to respective priority criteria in the weighted combination may also be adjusted based on a value of a given one of the priority criteria. For example, respective weights attributed to a first priority criteria and to a second priority criteria may be adjusted in the weighted combination based on a current speed of the vehicle, since different edges may be more or less desirable depending on how fast or slow the vehicle is moving.

In at least some embodiments of the present technology, it is contemplated that the electronic device 210 may be configured to generate "light" attributes for respective nodes of the preliminary graph-structure. These attributes for respective pairs of nodes may be used by the electronic device 210 for ranking purposes of a given edge in the preliminary graph-structure, as it will be described in greater details herein further below. In some embodiments, it can be said that a first subset of attributes may be generated for respective nodes of the preliminary graph-structure for determining a priority order for its edges, and during the iterative process described below, a second subset of attributes may be generated for its edges. For example, the second subset of attributes may comprise attributes that are generated by the electronic device 210 for intermediate potential positions associated with respective edges. It can be said that determining the first subset of attributes is less computationally-expensive if compared to determining the second subset of attributes.

In other embodiments, the priority logic may be implemented by the electronic device 210 as a trained Machine Learning Algorithm (MLA). The MLA implemented by the electronic device 210 may be any suitable conventional MLA. For example, the MLA may be any of various conventional MLAs, including, without limitation, "deep learning" algorithms, other types of neural networks or "connectionist" systems, decision trees, decision forests, Bayesian networks, or other known or later developed MLAs that use training datasets (e.g., supervised or semi-supervised learning algorithms). The manner in which a prediction, a label, and training technique used to train the MLA may depend on inter alia specific implementations of the present technology.

Once the MLA has been trained, information representative of the MLA may be sent to an electronic device associated with a self-driving vehicle, such as the electronic device 210. The MLA may then be used in ranking of edges of a given preliminary graph-structure.

In some embodiments, the MLA may have been trained to generate a predicted priority score for a given edge based on a feature vector generated based on values of the pre-determined priority criteria. The MLA may be so-trained on a labelled dataset of edges with respective training values of the pre-determined priority criteria and where the labels are indicative of a ground-truth priority order of training edges.

It is contemplated that the electronic device 210 may make use of the MLA for determining weights for respective priority criteria in a prioritization formula. In at least some embodiments, it is contemplated that the MLA may be trained based on a set of training scenarios that have previously occurred. For each scenario, a training graph-structure may be generated, which includes all possible edges for a road segment of this training scenario, and a target path (ground-truth) may be selected in this graph-structure for this training scenario. The edges of such a training graph-structure may be ranked based on weights and the values of the respective priority criteria in accordance with the prioritization formula. In one example, if the edges from this target path are not the top ranked edges in the ranked order of edges, the MLA may be penalized for learning from this training iteration. Irrespective of a particular loss function that is used, the goal is to train the MLA to determine weights for respective priority criteria in the prioritization formula such that the top ranked edges for respective scenarios correspond to the edges of respective target paths.

In the context of the present technology, the electronic device 210 is configured to use the ranked list of edges 550 in order to generate the "actual" graph-structure used by the electronic device 210 for controlling the vehicle 220 on the road segment. It should be noted that the electronic device 210 may use the ranked list of edges 550 for executing an iterative generation process during which, a plurality of iterations is executed by the electronic device 210 for iteratively generating attributes for edges of the second (actual) graph-structure.

As it will be discussed in greater details below, with each iteration, a given edge from the ranked list of edges 550 is added to a current number of edges of the second graph-structure, and the electronic device 210 determines whether the addition of the given edge meets a "stopping condition" of the iterative process. For example, during a given iteration, the electronic device 210 may compute at least some data for a given edge from the ranked list of edges 550 and add that given edge to a current number of edges in the second graph-structure. It is contemplated that a stopping condition of the iterative process may be indicative of a total number of edges that the second graph-structure should have. In one embodiment, if the electronic device 210 determines that the current number of edges in the graph-structure is above a pre-determined number of edges, the electronic device 210 may stop the iterative generation process of the second graph-structure.

It should be noted that generating data for respective edges of the second graph-structure is a computationally expensive operation. As it will be described below, the electronic device 210 may be configured to generate a plurality of attributes for respective edges of the second graph-structure. Developers of the present technology have realized that iteratively generating attributes for edges from a ranked list of edges allows to prioritize generation of attributes for high priority edges over generation of attributes of low priority edges. Furthermore, developers of the present technology have realized that iteratively generating attributes for a ranked list of edges until a pre-determined limit is met allows reducing the time required for generating the second graph-structure, while ensuring that the attributes for high priority edges are generated and/or avoiding generating attributes for low priority edges.

To better illustrate this iterative generation process, reference will now be made to FIG. 6 that depicts a representation 600 of the iterative process performed by the electronic device 210 for generating a second graph-structure 680. As seen, there is depicted a first iteration 601, a second iteration 602, a third iteration 603, a fourth iteration 604 and an $i^{th}$ iteration 699 of the iterative process.

To begin with, let it be assumed that a highest ranked edge (highest priority) in the ranked list of edges 550 is the first edge 651. During the first iteration 601, the electronic device 210 is configured to generate attributes for the first edge 651.

In some embodiments of the present technology, the electronic device 210 may be configured to generate attributes for a plurality of intermediary points along the first edge 651. For example, the electronic device 210 may determine a set of intermediary points between a respective pair of nodes and along the first edge 651 and may generate attributes for respective ones from the set of intermediary points of the first edge 651.

Attributes associated with a given edge and/or a respective intermediary point along the given edge may include static attributes and dynamic attributes. In at least some embodiments of the present technology the attributes include, but are not limited to:

a distance of the given edge or intermediary point thereof from one or more static objects (pits, stones on the road, fallen trees, road cones, curbs)

a distance of the given edge or intermediary point thereof to one or more dynamic objects: other cars, motorcyclists, cyclists, pedestrians (both walking on the road and the sidewalk)

a distance of the given edge or intermediary point thereof from a lane center;

a curvature of a portion of the road segment corresponding to the given edge or intermediary point thereof;

a position of the steering wheel for the given edge or intermediary point thereof;

a speed and acceleration of the vehicle for the given edge or intermediary point thereof;

a legal speed limit for the given edge or intermediary point thereof;

a physical limit of one or more parameters of the vehicle for the given edge or intermediary point thereof;

an estimated amount of time for travelling along the given edge; and other road rules based properties (whether the given edge the intersects a solid line).

Irrespective of types of attributes being generated, the electronic device 210 is configured to generate edge data 671 comprising attributes generated for the first edge 651 (and/or a respective set of intermediary positions).

Continuing with the illustrated example of the iterative generation process, let it also be assumed that in the ranked list of edges 550, a second edge 653, a third edge 654, and the edge 430 are ranked following the first edge 651 in that order. As such, by the same token as for the first iteration 601, the electronic device 210 may be configured to generate edge data 672 for the second edge 652 during the second iteration 602, edge data 673 for the third edge 654 during the third iteration 603, and edge data 674 for the edge 430 during the fourth iteration 604, in that order.

Continuing with the illustrated example, let it be assumed that the electronic device 210 iteratively generated edge data for edges 653, 654, 655, 656, 657, 658, 659, 660, 661, 662, 663, 664 in a similar manner to how the electronic device 210 is configured to generate the edge data for respective ones from the first edge, the second edge, the third edge, and the edge 430.

The electronic device 210 may be configured to perform a number of such iterations while verifying whether a stopping condition has been met during each respective iteration. For example, let it be assumed that the electronic device 210 during the $i^{th}$ iteration 699 generates edge data 675 for the edge 662. It can be said that during the $i^{th}$ iteration 699, the electronic device 210 adds the edge 662 to a current number of edges of the second graph-structure 680.

The electronic device 210 may be configured to compare the current number of edges against a pre-determined limit expressed, for example, in terms of at least one of (i) a maximum total number of edges to be included in the graph-structure 680 and (ii) a maximum total number of intermediary points that are to be covered by the edges in the graph-structure 680.

For example, let it be assumed that once the electronic device 210 adds the edge 662 to the current number of edges of the graph-structure 680, the current number of edges is below the pre-determined limit. In such a case, the electronic device 210 may proceed with an other iteration and generate edge data for a next best ranked edge in the ranked list of edges 550. However, if the current number of edges is equal or above the pre-determined limit, the electronic device 210 may stop the generation process of the graph-structure 680.

Figure 6:
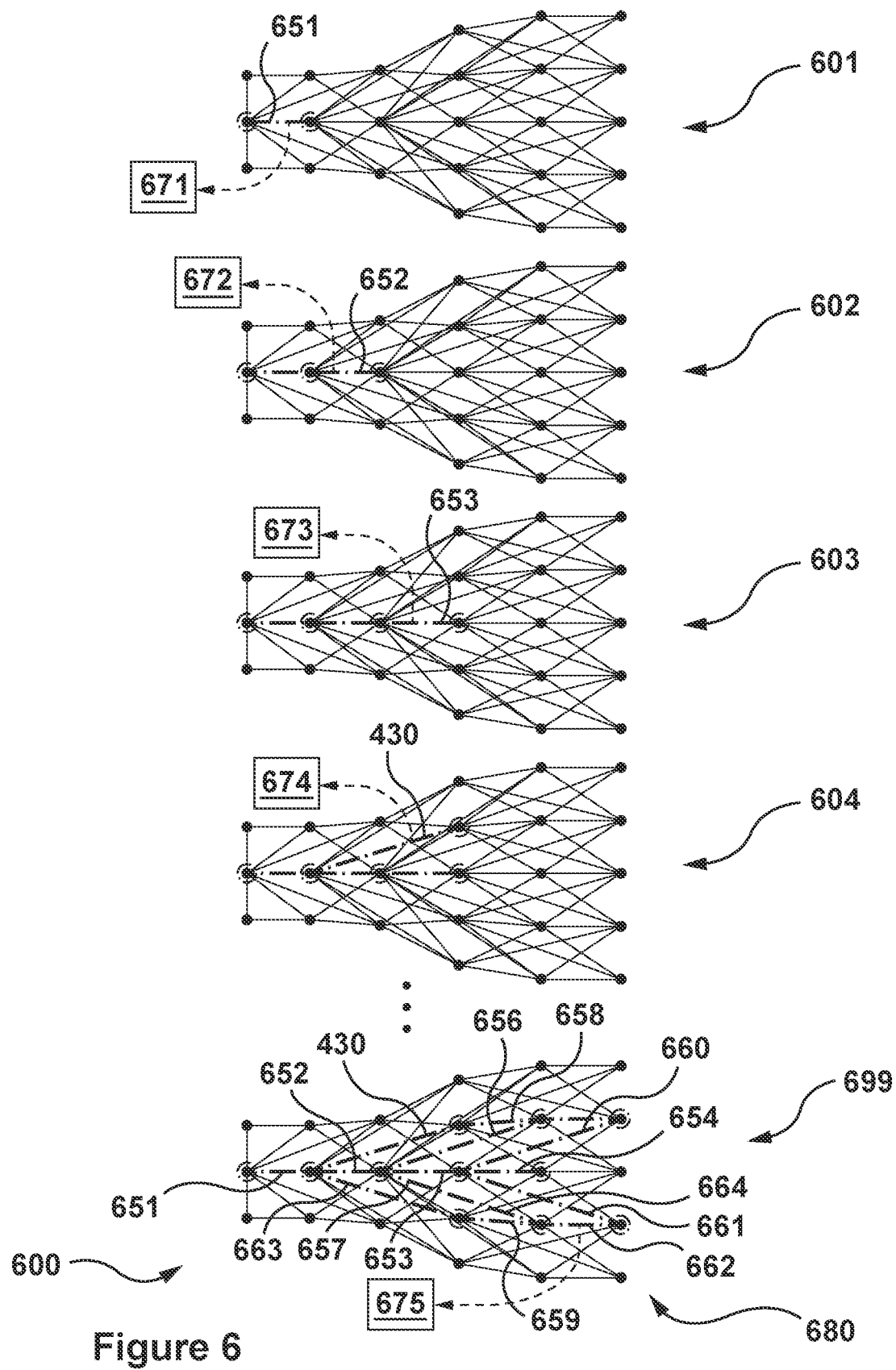
FIG. 6 depicts a representation of an iterative process performed by the electronic device for generating a second graph-structure for the road segment in accordance with some embodiments of the present technology.

It should be noted that the ranked order of edges in the non-limiting example illustrated in FIG. 6 is only one possible example of an order in which the edges can be ranked by the electronic device 210. The order in which the edges of a given preliminary graph-structure are ranked may depend on inter alia specific implementations of the present technology. In one other non-limiting example, the ranked order of edges may include at the top thereof edges of the given preliminary graph-structure that are closest to a lane center of a lane in which the vehicle 220 is currently operating, and then peripheral edges of the given preliminary graph-structure. Promoting peripheral edges in the ranked list may allow increasing the area of a road segment covered by a given second graph-structure, since their promotion increases the likelihood of them being selected during the iterative generation process.

In at least some embodiments of the present technology, the electronic device 210 may also be configured to take into account "connectivity" between edges that are being iteratively selected from the ranked order of edges. For example, at a given iteration, the electronic device 210 may be configured to select a next top ranked edge from the ranked list of edges (for generating respective attributes) and which is also connected to at least one other edge that has already been selected by the electronic device 210 during a previous iteration. In some embodiments, if the next top ranked edge in the ranked list of edges is not connected to any other edge that has already been selected, the electronic device 210 may "skip" that edge, and may verify whether a second next top ranked edge in the ranked list of edges is connected to any other edge that has already been selected. So-discriminating between edges in the ranked order of edges may ensure that a final graph-structure resulting from the iterative generation process is a single, connected graph-structure—that is, each edge of a given second graph-structure is connected to at least one other edge of the given second graph-structure.

As mentioned above, the electronic device 210 may make use of the second graph-structure 680 for operating the vehicle 220 on the road segment. To that end, the electronic device 210 may generate a "path" for the vehicle 220 on the road segment and which is representative of a respective sequence of edges in the second graph-structure 680.

Broadly speaking, the electronic device 210 is configured to generate one or more potential paths that the vehicle 220 may follow on the road segment. These paths may also be ranked amongst each other based on a total cost associated with a respective sequence of edges. For example, edge cost criteria may be applied onto attributes of the respective edges in a given sequence for determining in a sense a total "cost" for the sequence of edges. The electronic device 210 may rank the paths based on how costly a respective sequence of edges is.

Figure 7:
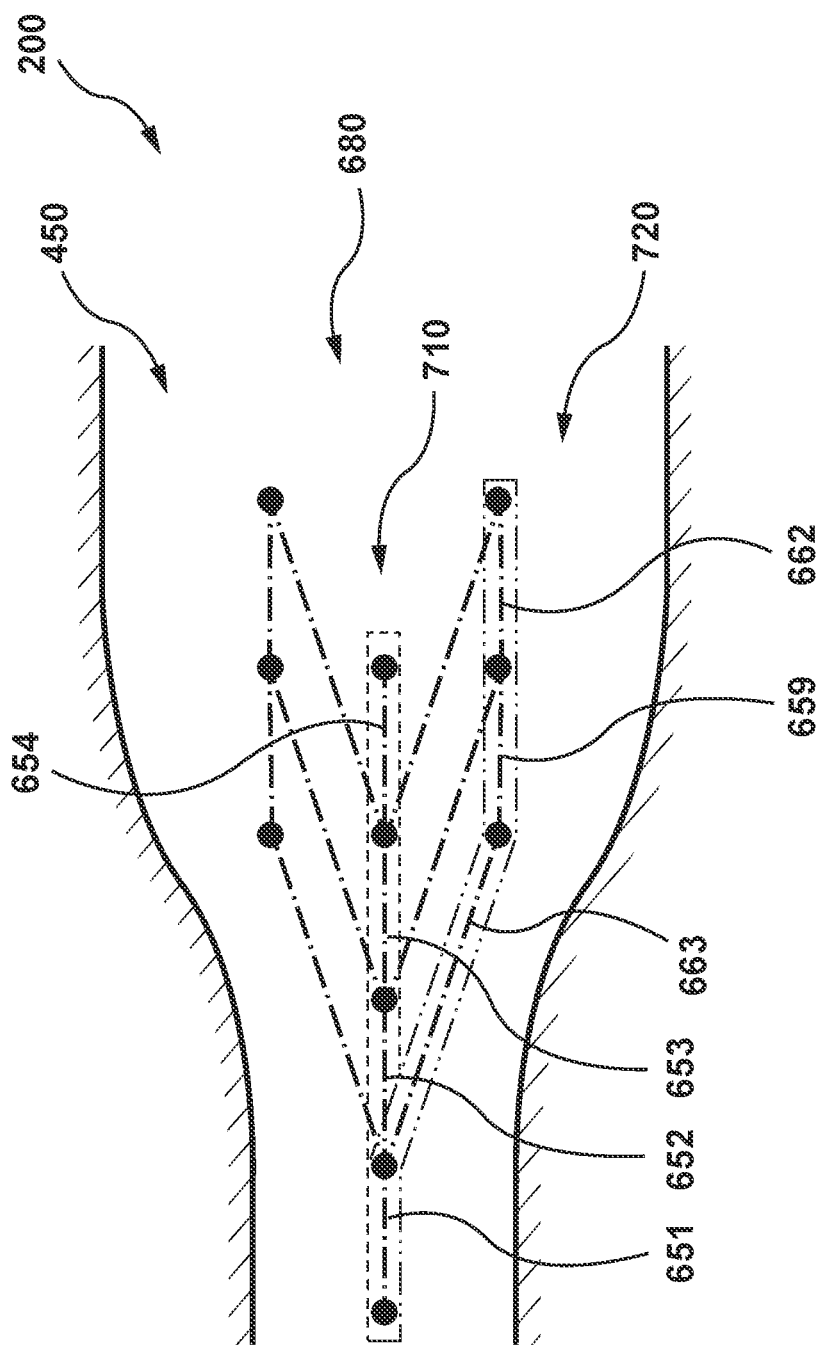
FIG. 7 depicts a representation of the second graph-structure and of paths generated by the electronic device for the road segment in accordance with some embodiments of the present technology.

With reference to FIG. 7, there is depicted a representation 700 of how the electronic device 210 may be configured to generate a first path 710 and a second path 720. The electronic device 210 may use the edges 651, 652, 653, and 654 for generating the first path 710 and the edges 651, 663, 659 and 662 for generating the second path 720. The electronic device 210 may select a given one from the first path 710 and the second path 720 a given path to be followed by the vehicle 220 during operation on the road segment 350.

To that end, the electronic device 210 may apply the edge cost criteria onto the edge data associated with edges of a respective sequence of edges and use a total cost for the respective sequence of edges a ranking score for selecting the path to be followed by the vehicle 220 on the road segment 350.

Let it be assumed that the electronic device 210 selects the second path 720 as the path to be followed by the vehicle 220. The electronic device 210 may use the attributes of the respective sequence of edges for generating a trajectory for the vehicle 220 that follows the second path 720. This means that the electronic device 210 may be configured to generate trajectory data for operating the vehicle 220 on the road segment 350 based on the edge data associated with the sequence of the edges 651, 663, 659 and 662 such that the vehicle 220 follows the second path 720 on the road segment 350. The electronic device 210 may also cause operation of the vehicle 220 in accordance with the so-determined trajectory on the road segment 350.

Figure 8:
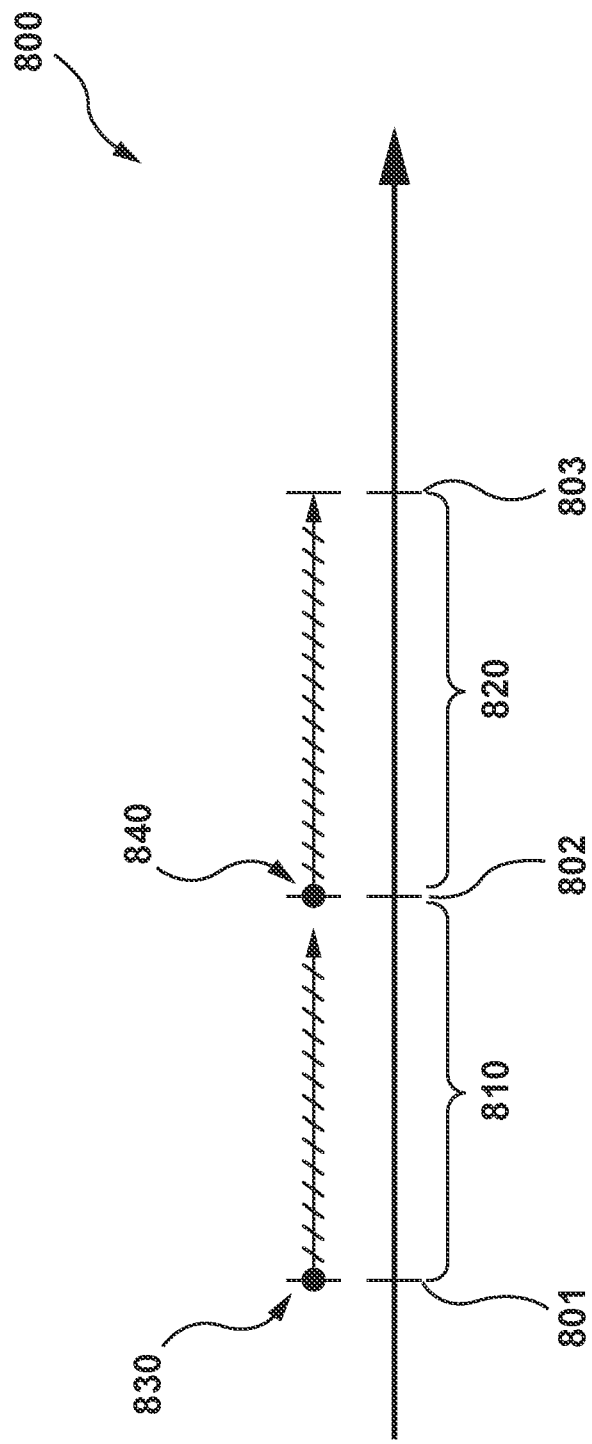
FIG. 8 depicts a representation of planning cycles during which the electronic device generates respective second graph-structures for the road segment in accordance with some embodiments of the present technology.

It should be noted that the electronic device 210 may be configured to periodically generate second graph-structures at respective moments in time during operation of the vehicle 220 similarly to how the electronic device 210 generate the second graph-structure 680. For example, with reference to FIG. 8, there is depicted a representation 800 of a first planning cycle 810 and a second planning cycle 820. Each planning cycle corresponds to what is called a "tick", during which the electronic device 210 is configured to inter alia generate a given preliminary graph-structure and then a respective second graph-structure for operating the vehicle 220, and until a next tick is performed by the electronic device 210.

The first planning cycle 810 may be initiated at a moment 801 during which a second graph-structure 830 is generated by the electronic device 210. During the first planning cycle 810, the electronic device 210 may use the second-graph structure 830 for operating the vehicle 220. Similarly, the second planning cycle 820 may be initiated at a moment 802 during which a (new) second graph-structure 840 is generated by the electronic device 210. During the second planning cycle 820, the electronic device 210 may use the second-graph structure 840 for operating the vehicle 220. Such cyclical generation of second graph-structures may be performed at pre-determined intervals of time during operation of the vehicle 220.

Figure 9:
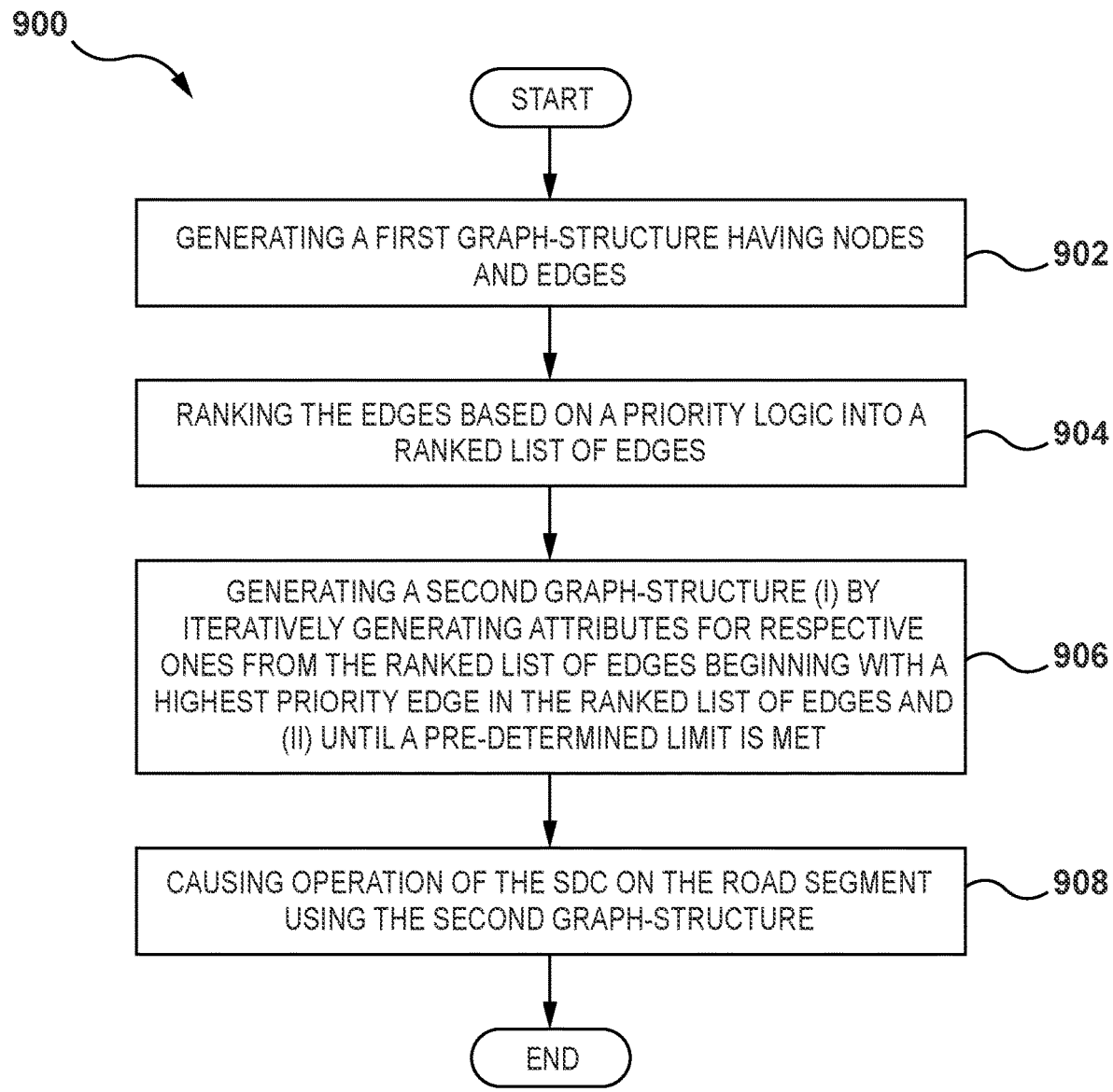
FIG. 9 is a schematic representation of a method performed by the electronic device in accordance with at least some non-limiting embodiments of the present technology.

In some embodiments of the present technology, the electronic device 210 is configured to execute a method 900 which is schematically illustrated in FIG. 9. Various steps of the method 900 will now be discussed in greater details.

Step 902: Generating a First Graph-Structure Having Nodes and Edges

The method 900 begins at step 900 with the electronic device 210 configured to generate a first graph-structure having nodes and edges. It can be said that the first graph-structure is a preliminary graph-structure generated by the electronic device 210. For example, the electronic device 210 may be configured to generate the first graph-structure 450 (see FIG. 4).

A given node in the first graph-structure is associated with a respective potential position of the SDC on the road segment, and a given edge is representative of a transition of the SDC between potential positions of the respective pair of nodes.

Step 904: Ranking the Edges Based on a Priority Logic into a Ranked List of Edges The method 900 continues to step 904 with the electronic device 210 configured to rank the edges of the first graph-structure into a ranked list of edges being indicative of a priority order of transitions between the respective potential positions of the vehicle 220 for operating the vehicle 220 on the road segment 350. For example, the electronic device 210 may rank the edges of the first graph-structure 450 into the ranked list of edges 550.

In some embodiments of the present technology, as part of the step 904, the electronic device 210 may be configured to determine a given ranked score for a respective edge based a weighted combination of pre-determined priority criteria. The pre-determined priority criteria including at least one of: a positional offset of a given edge from a lane center, a length of the given edge, a distance between the given edge and a current position of the vehicle, an association of the edge with one of a current lane and a target lane, a curvature of the road segment corresponding to the given edge, a current speed of the vehicle, and a legal speed limit on the road segment.

In further embodiments of the present technology, as part of the step 904, the electronic device 210 may execute the MLA having been trained to generate a predicted priority score for a given edge based on a plurality of pre-determined priority criteria, and where the edges can be ranked based on the respective predicted priority scores.

Step 906: Generating a Second Graph-Structure (i) by Iteratively Generating Attributes for Respective Ones from the Ranked List of Edges Beginning with a Highest Priority Edge in the Ranked List of Edges and (ii) Until a Pre-Determined Limit is Met The method 900 continues to step 906 with the electronic device 210 configured to generate a second graph-structure by iteratively generating attributes for respective ones from the ranked list of edges beginning with a highest priority edge in the ranked list of edges and until a pre-determined limit is met. The second graph-structure has a set of edges from the first graph-structure for which the attributes are generated.

It should be noted that the pre-determined limit is indicative of a total number of edges to be included in the second graph-structure. In some embodiments, the pre-determined limit may be the total number of edges to be included in the second graph-structure. In other embodiments, the pre-determined limit may be a total number of intermediary points along edges for which the attributes are to be determined.

In at least some embodiments, the attributes generated for a given edge may include a distance of a given edge from one or more static objects on the road segment, and a distance of the given edge one or more dynamic objects on the road segment.

It can be said that the electronic device 210 may be configured to perform an iterative generation process of the second graph-structure. For example, as part of the step 906, the electronic device 210 may be configured to execute a first iteration and a second iteration of the iterative generation process of the second graph-structure. During the first iteration, the electronic device 210 may be configured to generate the attributes for a first edge in the ranked list of edges. This first edge is added to a current number of edges currently included in the second graph-structure. During the first iteration, the electronic device 210 may also be configured to compare the current number of edges against the pre-determined limit.

In response to the current number of edges being below the pre-determined limit, the electronic device 210 may trigger the second iteration. During the second iteration, the electronic device 210 may be configured to generate the attributes for a second edge in the ranked list of edges, and where the second edge is ranked immediately after the first edge in the ranked list of edges. The second edge is added to the current number of edges currently included in the second graph-structure. During the second iteration, the electronic device 210 may also be configured to compare the current number of edges against the pre-determined limit. In response to the current number of edges being equal to the pre-determined limit, the electronic device 210 may be configured to stop generation of the second graph-structure.

Step 908: Causing Operation of the SDC on the Road Segment Using the Second Graph-Structure The method 900 continues to step 908 with the electronic device 210 configured to cause operation of the vehicle 220 on the road segment using the second graph-structure. In some embodiments, during the step 908, the electronic device 210 may be configured to generate a potential path for the vehicle 220 on the road segment which is representative of a respective sequence of edges in the second graph-structure. The electronic device 210 may also generate a potential trajectory for the vehicle 220 on the road segment using the attributes of the edges in the respective sequence of edges, and cause operation of the vehicle 220 for travelling on the road segment in accordance with the potential trajectory.

In some embodiments, the electronic device 210 may be configured to generate second graph-structures in a periodical manner during operation of the vehicle 220. For example, the electronic device 210 may be configured to generate a respective second graph-structure for respective planning cycles of the vehicle 220.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

While the above-described implementations have been described and shown with reference to particular steps performed in a particular order, it will be understood that some of these steps may be combined, sub-divided, or re-ordered without departing from the teachings of the present technology. Accordingly, the order and grouping of the steps is not a limitation of the present technology.

The invention claimed is:

1. A method of operating a Self-Driving Car (SDC) on a road segment, the SDC travelling on the road segment, the SDC being controlled by an electronic device, the method executable by the electronic device, the method comprising:
generating, by the electronic device, a first graph-structure having nodes and edges,
a given node being associated with a respective potential position of the SDC on the road segment, a given edge being representative of a transition of the SDC between potential positions of pairs of nodes;
ranking, by the electronic device, the edges based on a priority logic into a ranked list of edges,
the ranked list of edges being indicative of a priority order of transitions between the respective potential positions of the SDC for operating the SDC on the road segment;
generating, by the electronic device, a second graph-structure (i) by iteratively generating attributes for respective ones from the ranked list of edges beginning with a highest priority edge in the ranked list of edges and (ii) until a pre-determined limit is met,
the pre-determined limit being indicative of a total number of edges to be included in the second graph-structure;
the second graph-structure having a set of edges from the first graph-structure for which the attributes are generated; and
causing, by the electronic device, operation of the SDC on the road segment using the second graph-structure.

2. The method of claim 1, wherein the generating the second graph-structure comprises executing, by the electronic device, a first iteration and a second iteration,
the executing the first iteration including:
generating, by the electronic device, the attributes for a first edge in the ranked list of edges, the first edge being added to a current number of edges currently included in the second graph-structure, and comparing, by the electronic device, the current number of edges against the pre-determined limit;

in response to the current number of edges being below the pre-determined limit, triggering execution of the second iteration, the executing the second iteration including:

generating, by the electronic device, the attributes for a second edge in the ranked list of edges, the second edge being ranked immediately after the first edge in the ranked list of edges, the second edge being added to the current number of edges currently included in the second graph-structure, and comparing, by the electronic device, the current number of edges against the pre-determined limit; and in response to the current number of edges being equal to the pre-determined limit, stopping generation of the second graph-structure.

3. The method of claim 1, wherein the causing operation of the SDC using the second graph-structure comprises:

generating, by the electronic device, a potential path for the SDC on the road segment, the potential path being representative of a respective sequence of edges in the second graph-structure;

generating, by the electronic device, a potential trajectory for the SDC on the road segment using the attributes of the edges in the respective sequence of edges; and causing, by the electronic device, operation of the SDC for travelling on the road segment in accordance with the potential trajectory.

4. The method of claim 1, wherein the ranking the edges into the ranked list of edges based on the priority logic comprises:

determining, by the electronic device, a weighted combination of pre-determined priority criteria, the pre-determined priority criteria including at least one of:

a positional offset of a given edge from a lane center, a length of the given edge, a distance between the given edge and a current position of the SDC, an association of the edge with one of a current lane and a target lane, a curvature of the road segment corresponding to the given edge, a current speed of the SDC, and a legal speed limit on the road segment.

5. The method of claim 1, wherein the ranking the edges based on the priority logic into the ranked list of edges comprises:

generating predicted priority scores for each of the edges by a Machine Learning Algorithm (MLA) having been trained to generate a predicted priority score for a given edge based on a plurality of pre-determined priority criteria, and ranking the edges based on the predicted priority scores.

6. The method of claim 1, wherein the attributes of a given edge comprise at least one of:

a distance of a given edge from one or more static objects on the road segment, and a distance of the given edge one or more dynamic objects on the road segment.

7. The method of claim 1, wherein the pre-determined limit is the total number of edges.

8. The method of claim 1, wherein the pre-determined limit is a total number of intermediary points along edges for which the attributes are to be determined.

9. The method of claim 1, wherein the second graph-structure is used for operating the SDC on the road segment during a first planning cycle, and wherein the method further comprises:

generating, by the electronic device an other second graph-structure for a second planning cycle; and causing, by the electronic device, operation of the SDC on the road segment using the other second graph-structure during the second planning cycle.

10. The method of claim 9, wherein the method further comprises:

receiving, by the electronic device, first sensor data at a first moment in time from a sensor system mounted on the SDC, the first sensor data being indicative of information about the road segment at the first moment in time;

causing, by the electronic device, the first planning cycle at the first moment in time for generating the second graph-structure based on the first sensor data;

receiving, by the electronic device, second sensor data at a second moment in time from the sensor system mounted on the SDC, the second sensor data being indicative of information about the road segment at the second moment in time, the second moment in time being after the first moment in time; and causing, by the electronic device, the second planning cycle at the second moment in time for generating the other second graph-structure based on the second sensor data.

11. The method of claim 1, wherein the generating the second graph-structure comprises executing, by the electronic device, a first iteration and a second iteration, the executing the first iteration including:

generating, by the electronic device, the attributes for a first edge in the ranked list of edges, the first edge being added to a current number of edges currently included in the second graph-structure, and comparing, by the electronic device, the current number of edges against the pre-determined limit;

in response to the current number of edges being below the pre-determined limit, triggering execution of the second iteration, the executing the second iteration including:

generating, by the electronic device, the attributes for a second edge in the ranked list of edges, the second edge being a next edge in the ranked list of edges after the first edge and which is connected to at least one edge currently included in the second graph-structure, the second edge being added to the current number of edges currently included in the second graph-structure, and comparing, by the electronic device, the current number of edges against the pre-determined limit; and in response to the current number of edges being equal to the pre-determined limit, stopping generation of the second graph-structure.

12. An electronic device for operating a Self-Driving Car (SDC) on a road segment, the SDC travelling on the road segment, the SDC being controlled by the electronic device, the electronic device being configured to:

generate a first graph-structure having nodes and edges, a given node being associated with a respective potential position of the SDC on the road segment, a given edge being representative of a transition of the SDC between potential positions of pairs of nodes;

rank the edges based on a priority logic into a ranked list of edges,
the ranked list of edges being indicative of a priority order of transitions between the respective potential positions of the SDC for operating the SDC on the road segment;
generate a second graph-structure (i) by iteratively generating attributes for respective ones from the ranked list of edges beginning with a highest priority edge in the ranked list of edges and (ii) until a pre-determined limit is met,
the pre-determined limit being indicative of a total number of edges to be included in the second graph-structure,
the second graph-structure having a set of edges from the first graph-structure for which the attributes are generated; and
cause operation of the SDC on the road segment using the second graph-structure.

13. The electronic device of claim 12, wherein generating the second graph-structure comprises the electronic device being configured to:
execute a first iteration comprising:
generating the attributes for a first edge in the ranked list of edges,
adding the first edge to a current number of edges currently included in the second graph-structure, and
comparing the current number of edges against the pre-determined limit;
in response to the current number of edges being below the pre-determined limit, trigger execution of a second iteration, the second iteration comprising:
generating the attributes for a second edge in the ranked list of edges, the second edge being ranked immediately after the first edge in the ranked list of edges,
adding the second edge to the current number of edges currently included in the second graph-structure, and
comparing the current number of edges against the pre-determined limit; and
in response to the current number of edges being equal to the pre-determined limit, stop generation of the second graph-structure.

14. The electronic device of claim 12, wherein the electronic device is further configured to:
generate a potential path for the SDC on the road segment, the potential path being representative of a respective sequence of edges in the second graph-structure;
generate a potential trajectory for the SDC on the road segment using the attributes of the edges in the respective sequence of edges; and
cause operation of the SDC for travelling on the road segment in accordance with the potential trajectory.

15. The electronic device of claim 12, wherein ranking the edges into the ranked list of edges based on the priority logic comprises the electronic device being configured to:
determine a weighted combination of pre-determined priority criteria, the pre-determined priority criteria including at least one of:
a positional offset of a given edge from a lane center, a length of the given edge, a distance between the given edge and a current position of the SDC, an association of the edge with one of a current lane and a target lane, a curvature of the road segment corresponding to the given edge, a current speed of the SDC, and a legal speed limit on the road segment.

16. The electronic device of claim 12, wherein ranking the edges into the ranked list of edges based on the priority logic comprises the electronic device being configured to:
generate predicted priority scores for each of the edges by a Machine Learning Algorithm (MLA) having been trained to generate a predicted priority score for a given edge based on a plurality of pre-determined priority criteria, and
rank the edges based on the predicted priority scores.

17. The electronic device of claim 12, wherein the attributes of a given edge comprise at least one of:
a distance of a given edge from one or more static objects on the road segment, and a distance of the given edge one or more dynamic objects on the road segment.

18. The electronic device of claim 12, wherein the pre-determined limit is the total number of edges.

19. The electronic device of claim 12, wherein the pre-determined limit is a total number of intermediary points along edges for which the attributes are to be determined.

20. The electronic device of claim 12, wherein the second graph-structure is used for operating the SDC on the road segment during a first planning cycle, and wherein the electronic device is further configured to:
generate an other second graph-structure for a second planning cycle; and
cause operation of the SDC on the road segment using the other second graph-structure during the second planning cycle.

* * * * *